(12) United States Patent
Herrscher et al.

(10) Patent No.: US 6,298,759 B1
(45) Date of Patent: Oct. 9, 2001

(54) MULTI-SPINDLE MACHINE-TOOL IN PARTICULAR A MULTI-SPINDLE AUTOMATIC LATHE

(75) Inventors: Albert Herrscher, Bergisch Gladbach; Detlef Langer, Rösrath, both of (DE)

(73) Assignee: Alfred Schutte GmbH & Co., Cologne (DE)

( * ) Notice: Subject to any disclaimer, the term of this patent is extended or adjusted under 35 U.S.C. 154(b) by 0 days.

(21) Appl. No.: 09/528,611

(22) Filed: Mar. 20, 2000

(30) Foreign Application Priority Data

Apr. 10, 1999 (DE) .............................. 199 16 212

(51) Int. Cl.[7] .................. B23B 3/20; B23B 3/30
(52) U.S. Cl. .................. 82/129; 82/122; 82/124
(58) Field of Search ................ 82/122, 123, 129, 82/126, 124, 127

(56) References Cited

U.S. PATENT DOCUMENTS

| 1,804,971 | * | 5/1931 | Bullard, Jr. ................ 29/38 A |
| 3,203,316 | * | 8/1965 | Cashman et al. ............ 409/107 |
| 3,792,633 | * | 2/1974 | Filipiev et al. ............... 82/124 |
| 5,697,270 | * | 12/1997 | Link ............................ 82/129 |
| 5,768,962 | * | 6/1998 | Link et al. ................... 82/129 |
| 6,000,305 | * | 12/1999 | Link ............................ 82/129 |
| 6,085,622 | * | 7/2000 | Link et al. ................... 82/122 |
| 6,158,312 | * | 12/2000 | Link et al. ................... 82/122 |

FOREIGN PATENT DOCUMENTS

| 196 19 720 | 11/1997 | (DE) . |
| 198 43 575 | 4/2000 | (DE) . |
| 0 726 119 | 8/1996 | (EP) . |

* cited by examiner

*Primary Examiner*—Henry Tsai
(74) *Attorney, Agent, or Firm*—Vickers, Daniels & Young

(57) ABSTRACT

The invention relates to a multi-spindle machine tool, in particular a multi-spindle automatic lathe with several workpiece spindle units. These are arranged around a central axis, can be driven rotationally and can be advanced from one machining position to the next. In order to provide the greatest possible flexibility in the machining of workpieces in a machine of this type, the invention envisages that the workpiece spindle units can be moved independently of one another along a movement path running around the central axis. The machining positions are designed in the form of machining segments within whose limits the respective workpiece spindles or workpiece spindle units can move along the movement path during a machining process. Thus according to the invention, the workpiece spindles are not tied to fixed machining positions, which makes it possible to arrange the tools much more flexibly within the workspace of the machine, wherein for example in one machining segment more than one, two or more tools successively carry out different machining operations on the workpiece, while in another machining area only one machining process is executed.

53 Claims, 5 Drawing Sheets

MULTI-SPINDLE MACHINE-TOOL IN PARTICULAR A MULTI-SPINDLE AUTOMATIC LATHE

The present invention relates to the subject matter disclosed in German Patent Application No. 199 16 212.3 filed Apr. 10, 1999, the entire specification of which is incorporated herein by reference.

The invention relates to a multi-spindle machine-tool, in particular a multi-spindle automatic lathe, with multiple workpiece spindle units which are arranged around a central axis for rotational drive and advance from one machining position to the next.

BACKGROUND OF THE INVENTION

Multi-spindle machine-tools with multiple workpiece spindle units are, for example, known from EP 0 726 119 A1 or DE 196 19 720 A1. These known machine tools have a spindle drum, mounted on a machine frame, on which the workpiece spindles are mounted at rigidly fixed equal angles to one another and with which they are brought into the various machining positions by advancing the spindle drum. When the spindle drum is arrested in order to fix the workpiece spindles in their respective machining positions, machining of the workpieces clamped into the workpiece spindles takes place at the machining points, after which the spindle drum is advanced again and the workpiece spindles with the workpieces reach their next machining position.

It is a known practice, from DE 196 19 720 A1, to provide the individual machining stations with tool slides with two tools and to advance the spindle drum in such a way that, within each machining station, each spindle can be positioned successively in two positions so that the workpieces clamped in them are first machined by the first tool—in the direction of travel of the spindle drum—and are then, after advancing by a small angle, machined by the second tool. In this machine, twice as many machining positions as workpiece spindles are provided, if one looks down from the loading and unloading stations for loading and unloading of the workpieces.

The regular disposition of the workpiece spindles on the spindle drum in the known multi-spindle machine-tools has the disadvantage that the spindle drum can only be advanced when the longest-lasting machining process at one machining station has been completed. The stroke-time, that is the time until the drum is advanced, along with all workpiece spindles, is thus determined by the longest lasting machining operation at one machining station. It is thus often the case that only one tool at its respective station is engaged upon the workpiece, while at all other machining stations processing is already complete and the machining capacity of the individual machining stations cannot be exploited fully because of the enforced dead time. A further disadvantage of the advanceable spindle drum is that, for it to be moved in this circular advance process, its mass should ideally be as small as possible in order to achieve the required high speed of movement to advance the workpiece spindles into the next machining position. In order to keep the mass of the spindle drum within reasonable limits, its diameter and thus also that of the spindle circle must be kept as small as possible, which restricts the room available for the workpiece spindle units and which also leaves little room for arrangement of the machining tools in the individual machining stations and for the loading device. Reducing the spindle drum to the smallest possible size means that the central spindle-carrier too, on which the spindle drum, especially in the case of vertical machines, is normally mounted, cannot be designed as large as one would like so that it often lacks the required rigidity. A further disadvantage of the known machines is that the tool-carriers are arranged in fixed positions and thus cannot always be positioned optimally with respect to the workpiece.

SUMMARY OF THE INVENTION

The object of the invention is to create a multi-spindle machine-tool of the type set out above which produces the greatest possible flexibility in machining in the individual machining positions and with which the time available for machining in the machining positions can be exploited to the full by the workpiece spindle units.

This object is achieved in the invention in that the workpiece spindle units are moveable independently of one another along a movement path running around the central axis and that the machining positions are distributed and are designed as machining segments, within whose limits the respective workpiece spindles or workpiece spindle units are moveable during a machining process along the movement path.

The invention thus departs from the beaten path of the state of the art, in which adjacent workpiece spindle units, because of their arrangement on the spindle drum, are always at a fixed distance from one another. On the contrary, according to the invention the workpiece spindle units are moveable along the movement path independently of one another and thus their positions relative to one another can be altered. It is thus also possible to vary the size of the machining segments in certain areas and for example to provide two machining stations—arranged one after the other in the direction of the movement path—in one machining segment while in another, for example the immediately adjacent, machining segment, only one machining station is located and this machining segment is thus kept correspondingly smaller. With the arrangement according to the invention it is thus possible to have a machining process, which requires a long period of time, being carried out in an appropriately small machining segment with just one machining station, while in other machining segments within (approximately) the same processing time several machining processes are carried out at two or even more machining stations, for which purpose the relevant workpiece spindle unit can be moved within its machining segment along the movement path.

In addition, the arrangement according to the invention has the special advantage that owing to the movability of the workpiece spindle units along the movement path within the machining segment the spindle itself executes the required movements for processing of a workpiece in the direction of the X axis, which in the machine-tool according to the invention coincides with the movement path or runs parallel to the latter. Unlike the multi-spindle machine-tools known from the state of the art, the workpiece spindle units in the invention do not actually have to be arrested in a fixed position in the orientation of the X axis, but can move forward or backward within the limits of the machining segments. The required relative mobility between tool and workpiece in the orientation of the X axis need not therefore be realized by a tool—or workpiece slide—which is moveable in the direction of the workpiece spindle, but instead the tool—or the workpiece—can be positioned at a fixed point at the machining station within the machining segment, making an especially stable arrangement possible.

Normally it will be appropriate for the workpiece spindle units to be moveable along a circular movement path which runs around the central axis; however, it is also perfectly possible for the movement path to have another shape if this seems appropriate for the machining processes to be carried out. For example, the movement path can be elliptical, or may consist of two parallel straight line sections which at their ends are connected by bow or semi-circular sections (a longitudinal hole shape). The concept "central axis" should therefore not be understood within the meaning of the invention to mean that all workpiece spindle units are always at the same distance from the axis, rather "central axis" should be taken to mean an axis which is arranged in the interior of the closed movement path around which the workpiece spindle units travel and which forms the center of the movement path. In a preferred design of the invention where the invention is designed as a vertical machine-tool, and the axis is a vertical axis.

It is especially useful if each workpiece spindle has its own rotary drive so that each workpiece spindle can be rotated fully, independently of the other workpiece spindles. In addition, it is preferable for each workpiece spindle to have its own travel actuator so that it is moveable together with a workpiece clamped into the spindle head roughly transverse to the direction of the path of movement in the direction of the tool(s) arranged at the machining stations. The advancement drive can essentially consist of a conventional spindle drive or a hydraulic cylinder drive.

In a preferred design of the invention, the workpiece spindles are arranged moveably on a central rigid spindle carrier. The workpiece spindle units can then be fitted with guide shoes by which they are guided along at least one guide rail located on the spindle carrier. Preferably, each workpiece spindle unit has a drive device for moving it along the movement path, the drive essentially consisting of a linear motor. For this purpose, each workpiece spindle unit preferably has its own stator element for the linear motor drive and the spindle carrier is equipped with a rotor element shared by all workpiece spindle units for the linear motor drive. The actuator of each workpiece spindle unit then preferably has a position—and/or speed-measurement device so that each workpiece spindle unit can be regulated independently of another in its movement along the movement path and, thus can constantly be driven at the required speed and positioned at the required place.

Preferably, at the individual machining segments, machining tools and/or machining units are provided which are arranged directly or indirectly on the spindle carrier. This arrangement makes it possible to arrange the machine tools close to the workpiece spindles in the machining segments and thus to achieve especially high accuracy due to the minimal thermal and elastic deformation. The machining units can have a powered tool and/or an adjustable tool slide with a tool carried by it which then ideally is moveable transverse to the direction of the movement path.

Preferably, the axes of rotation of the workpiece spindles are arranged parallel to one another, indeed ideally parallel to the central axis. In many cases, however, it can also be advantageous to arrange the axes of rotation of the workpiece spindles at an angle to the central axis.

It is especially advantageous if each workpiece spindle unit is allocated its own supply unit, moveable with the workpiece spindle unit along the movement path, with control and/or current supply devices for the respective workpiece spindle and/or for drive along the movement path. An arrangement of this type in which the control and/or current supply devices for each workpiece spindle unit are arranged directly on the latter and are moveable along with the latter is described in the older, unpublished German Patent Application No. 198 43 575 A1 of applicant, the content of which explicitly forms the disclosure content of the present application and is incorporated herein by reference. When each workpiece spindle unit is allocated its own power supply unit with control and/or current supply devices for the respective workpiece spindle and drive, it is possible to restrict the number of contacts realized via slip-ring contacts or the like between the rigid part of the machine, i.e. for example the central rigid spindle carrier or an external switchgear cabinet and the moveable workpiece spindle units, thus guaranteeing especially reliable and accurate operation of the workpiece spindle units. In a preferred construction of the invention, the workpiece clamps of the workpiece spindle units project through openings in a telescopic or fan cover which separates the actual workspace of the machining areas or the machining tools operating within them from the workpiece spindles or workpiece spindle units. This cover prevents swarf or cooling fluid which may emanate from the workpiece clamp during the machining of a work piece from by-passing the workpiece clamp and reaching the more sensitive areas of the workpiece spindle unit such as, for example, its motor drive or the control or current supply devices, which otherwise could lead to damage to the workpiece spindle or to fault contacts. The design of the cover as a telescope or fan is thus advantageous in order to take into account the varying distances between the workpiece spindle units.

Preferably, the machine tool according to the invention is equipped with a machine casing surrounding the components of the machine, which may consist of an inner protective housing surrounding the workpiece spindle units and an outer protective housing surrounding this with a clearance space in between. In this case, it is then useful to connect a suction device to the outer protective housing. The clearance space between the two protective housings enables cooling fluids or oil vapor arising during machining of the workpieces to be sucked out by the suction device so that a clear view of the machining processes in the various machining areas from the outside is always guaranteed, if the protective housings are equipped in the conventional way with inspection windows for the machining segments. Preferably, the machine cover also has access openings to the machining segments which facilitates access to all machining points.

The machining segments can in an especially advantageous design of the invention have a variable length in the orientation of the movement path, and can therefore be adjusted and aligned optimally to each workpiece to be machined. The machining segments in the individual machining positions can thus be of variable sizes in the orientation of the movement path and can be adjusted to the various machining processes. Here, it is also not always necessary to allocate the machining tools arranged on the machine rigidly to the same machining positions or to the same machining segment, but it is conceivable to keep the machining segment of, for example, the first machining position, during the machining of a first workpiece, narrow or short, so that in this machining position only a single tool machines the work piece, while the next machining position or machining segment in the sequence has two tools arranged one after the other. During the machining of another workpiece, one (the front) tool of the second machining position can be allocated to the machining segment before it, the other workpiece then being machined in turn by two tools. It should be mentioned here that the concept "machining segment" or "machining area" should naturally also include the loading area(s) of the machine, where the completed workpieces are delivered and where new workpiece blanks are clamped on.

Further features and advantages of the invention can be found in the description below and the drawing which shows a preferred embodiment of the invention in more detail by means of an example.

BRIEF DESCRIPTION OF THE DRAWINGS

Reference may now be made to the drawings, which illustrate various embodiments that the invention may take in physical form and in certain parts and arrangement of parts wherein.

DETAILED DESCRIPTION OF THE INVENTION

Figure 1:
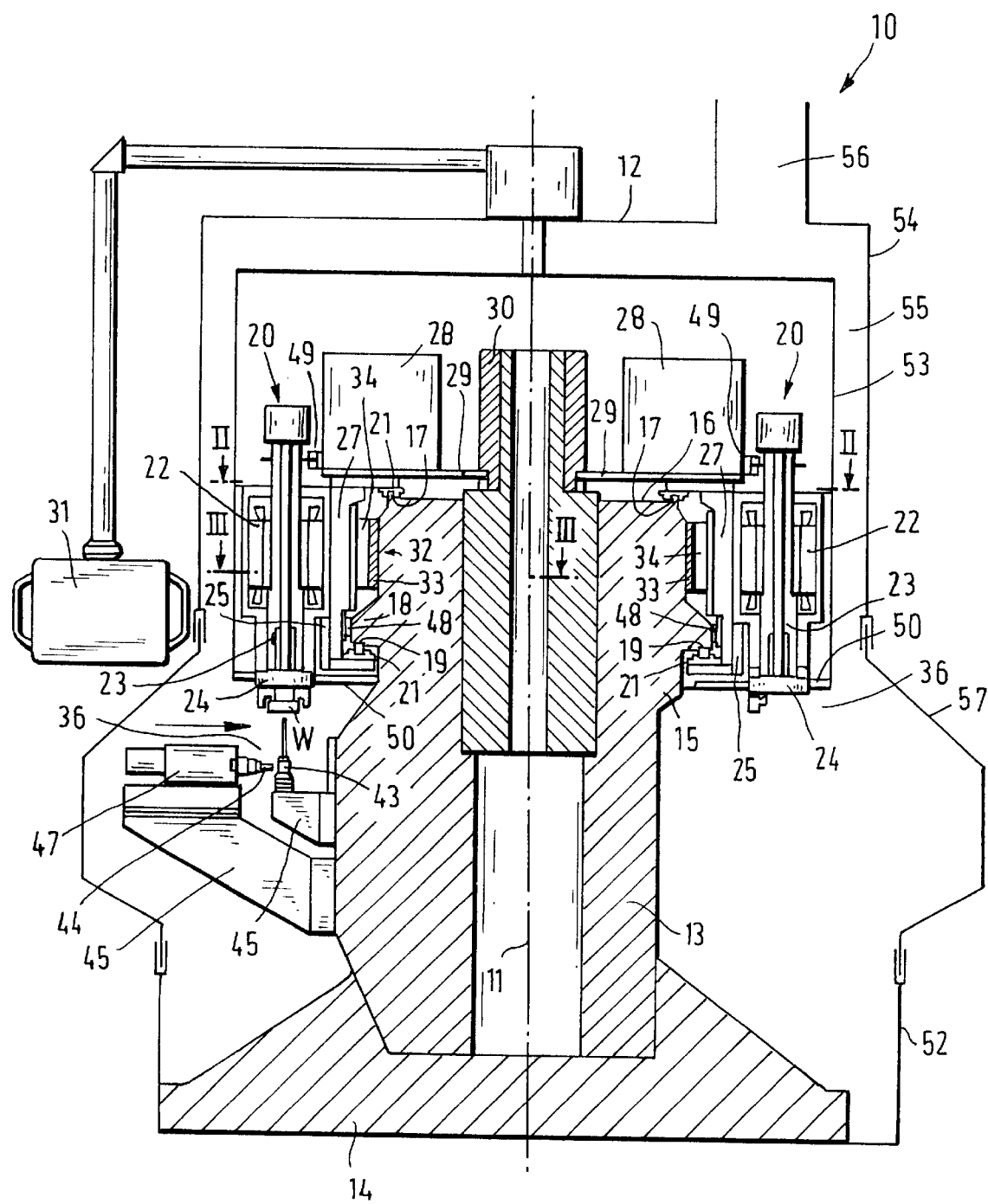
FIG. 1 shows a vertical, multi-spindle, automatic lathe according to the invention in a side view and partial section.

Referring now to the drawings, wherein the showings are for the purpose of illustrating preferred embodiments of the invention only and not for the purpose of limiting the same, reference is first had to FIG. 1 which illustrates multi-spindle automatic lathe 10, which for reasons of clarity has been shown greatly simplified in the drawing, is a so-called perpendicular or vertical machine with a vertical, central axis 11 and a spindle carrier 13 which is arranged centrally in the machine housing 12 and which stands up from a machine bed 14 upwards in an upright position. In its upper part 15, the spindle carrier 13 has been designed with rotational symmetry about the central axis 11. On the outer edge of its upper face 16, a first guide rail 17 is provided, as is, on a lower support ring 18 which protrudes radially outwards, a second guide rail 19. Several workpiece spindle units 20 are mounted using guide shoes 21 on the guide rails so as to be moveable along them in the peripheral direction of the spindle carrier 13. The workpiece spindle units consist essentially of a workpiece spindle 23 which is rotated by its own rotary drive 22, and which is equipped at its bottom end with a chuck 24 to take the workpiece W that is to be machined. Each workpiece spindle unit 20 also has a carriage assembly 25 along which the workpiece spindle can be moved in its vertical axis Z together with its actuator by a hydraulic drive 26 as outlined in FIG. 5. The guide shoes 21, which interact with the guide rails 17, 19, are arranged on the slide carrier 27 of the carriage assembly 25.

Additionally, each workpiece spindle unit 20 has its own supply unit 28 which can be moved in the peripheral direction of the spindle carrier 13 together with its associated workpiece spindle. The supply units house the control and power-supply units for the associated workpiece spindle, and its drives and are linked via a slip-ring assembly 29, or similar, to a power supply which is fed through a central tube 30 in the spindle carrier in a manner not described in detail and connected to an external set-point transmitter 31. This particular method of controlling and supplying power to the actuators of the individual workpiece spindles has been described in connection with a machine tool with a spindle drum in the earlier unpublished German Patent Application No. 198 43 575 which is hereby explicitly made the subject of this description and to the details of which reference is made.

Each workpiece spindle unit 20, in addition to the above mentioned components, is also allocated another drive 32 by which the workpiece spindle units can be moved in the peripheral direction of the spindle carrier along the guide rails. These drives 32 take the form of a type of linear motor and consist essentially of a permanently energized rotor element 33. The rotor element is arranged on the perimeter of the spindle carrier 13 along the total length of its perimeter, which interacts with stator elements 34 which are arranged on the inside of the slide carriers 27 of the workpiece spindle units. The stator elements 34 can be controlled and powered by the supply units 28 and hence move the workpiece spindle units along the guide rails.

Figure 2:
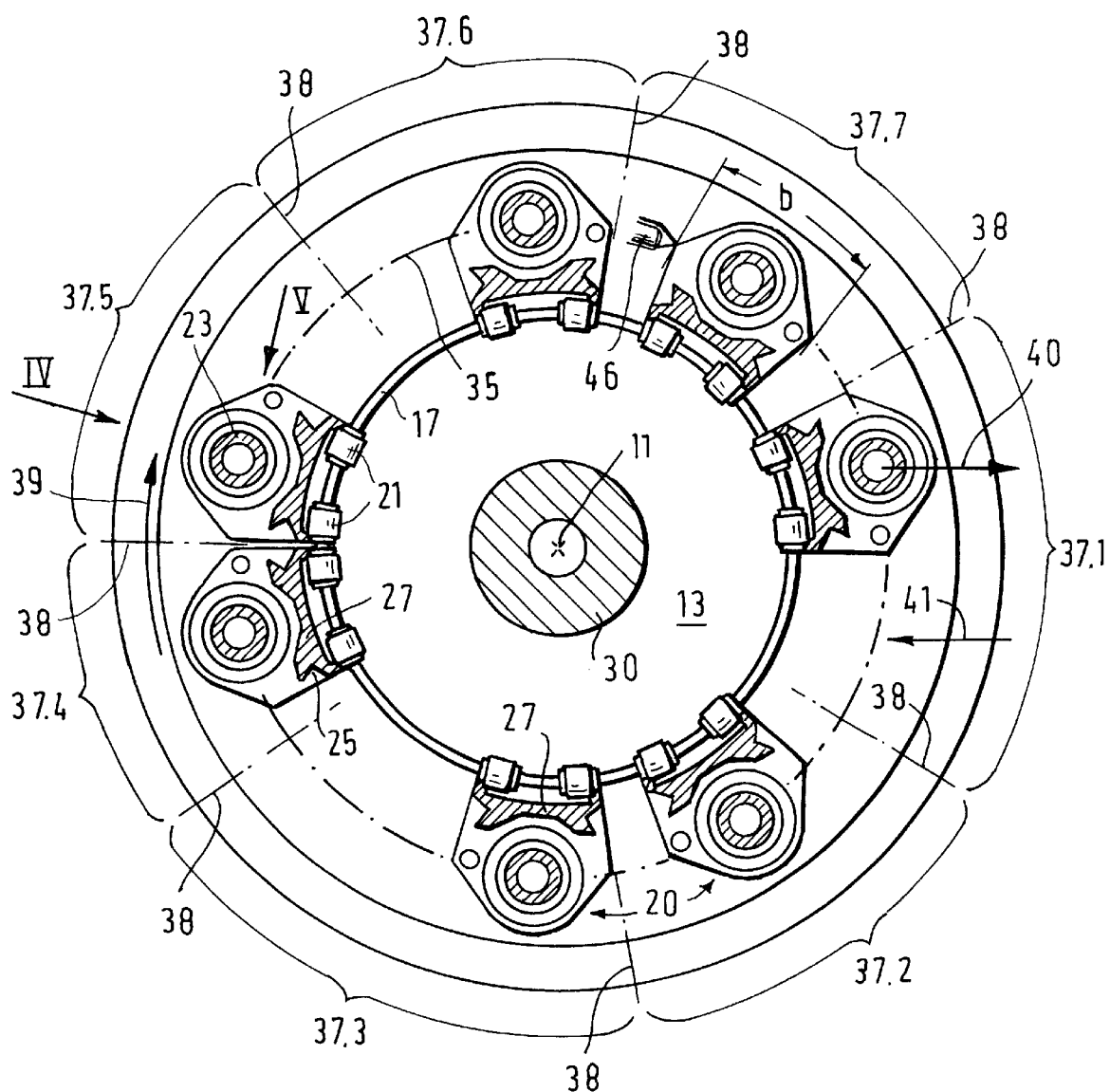
FIG. 2 shows the object of FIG. 1 in a section along the line II—II.
Figure 3:
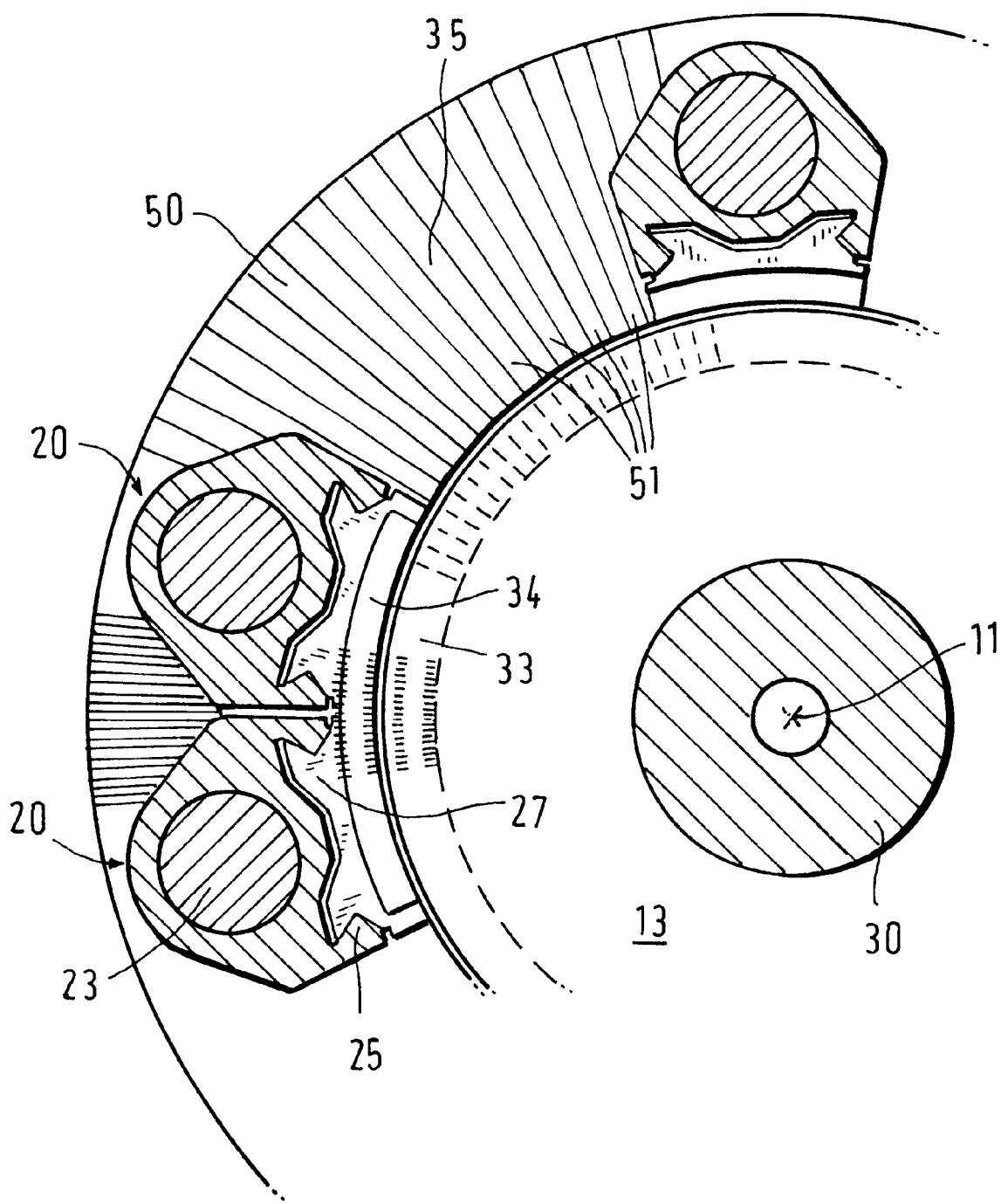
FIG. 3 shows a section through the spindle carrier and some of the workpiece spindle units arranged on it along the line III—III in FIG. 1 in an enlarged representation.
Figure 4:
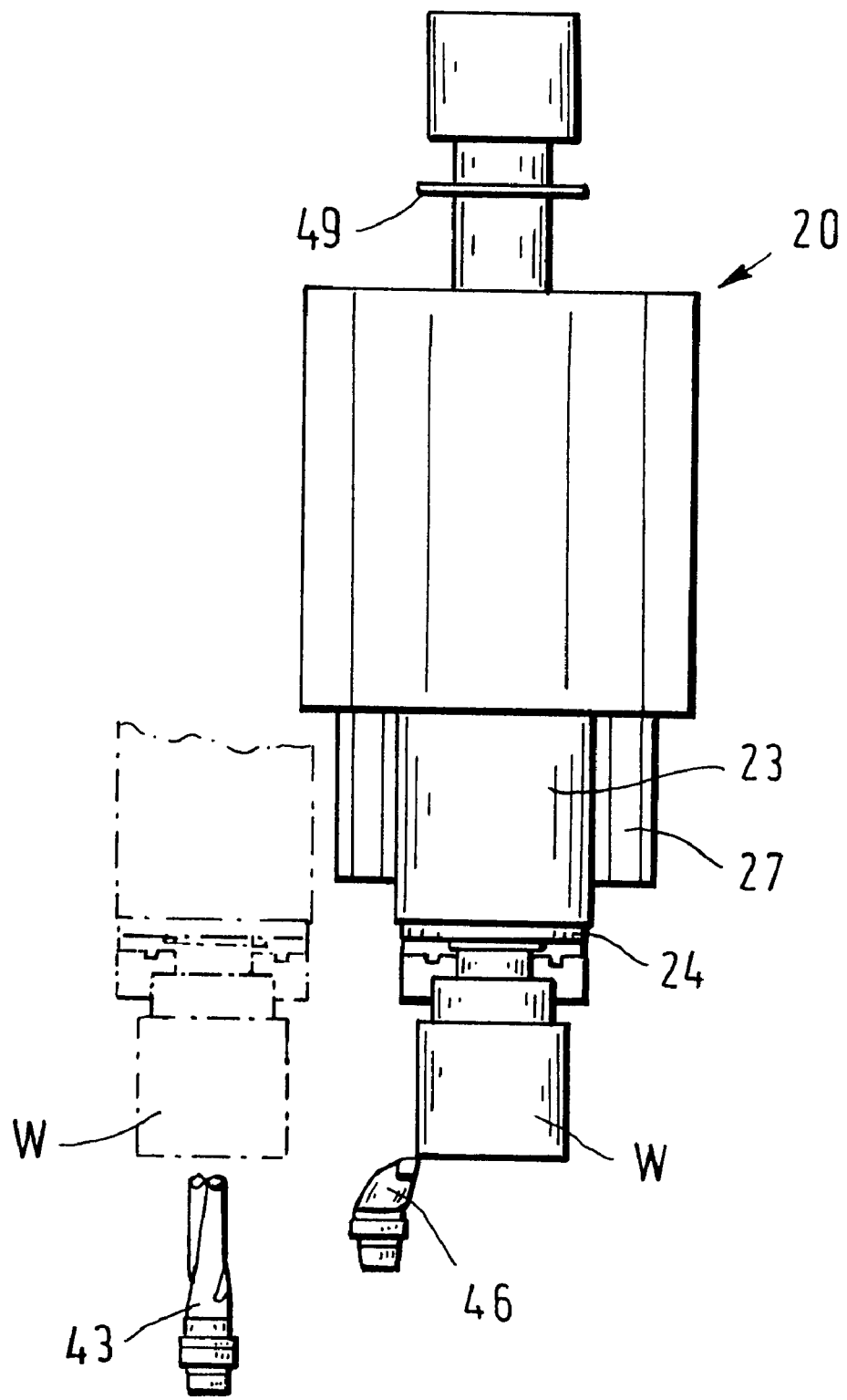
FIG. 4 shows a view in the direction of the arrow IV according to FIG. 2.

As best illustrated in FIGS. 2 and 3, there is no fixed, even spacing between the workpiece spindle units. Instead, they can be moved independently of each other along the guide rails 17, 19 along a movement path 35 running around the central axis 1 I and parallel to the guide rails. In the embodiment shown, this path is along a circular path. In contrast to traditional multi-spindle machines where the workpiece spindles are mounted on a common spindle drum, the workpiece spindle units in this invention do not have fixed machining positions. Instead, the workspace 36, which is located below the workpiece spindle units around the spindle carrier 13, is divided into several machining segments 37, and the number of said machining segments is generally equivalent to the number of workpiece spindle units. However, it is also possible to provide one or two segments more than the number of workpiece spindles. Within the limits 38 of a machining segment, one workpiece spindle unit is generally positioned which can be moved during a machining operation within those limits and in the direction of the movement path, i.e. along the guide rails 17, 19. Once the machining operations carried out on the workpieces have been completed in all machining segments 37, the workpiece spindle units are all advanced either simultaneously or one after the other in quick succession to the subsequent machining segment in the direction of the arrow 39.

As FIG. 2 also clearly shows, the individual machining segments 37.1–7 are of different sizes so that the distance which a workpiece spindle can travel, within the limits 38, during a machining operation, in the direction of the movement path, can vary from one machining segment to the next. Segment 37.1, for example, serves as a loading area for the workpiece spindles. A finished workpiece is shown as being passed by the workpiece spindle in a first position which is marked by solid lines to a workpiece unloading device (arrow 40), whereupon the workpiece spindle unit is moved forward within the limits of the loading area 37.1 and along the guide rails 17, 19 until it reaches a position where it takes a new, unworked piece from a delivery device which is not shown (arrow 41). The loading segment 37.1, in the embodiment shown, therefore has a length in the peripheral direction which is approximately equivalent to double the width b of a workpiece spindle unit.

The subsequent machining segment 37.2 is smaller than the loading segment 37.1 while the following machining segment 37.3 has a length in the peripheral direction that is larger than double the width of a workpiece spindle unit.

Machining segment 37.4 on the next machining position on the other hand is, in the peripheral orientation, only marginally longer than the width of a workpiece spindle unit which can therefore travel back and forth for only a very short distance in the movement path 35 during a machining operation.

The variable size of the machining areas or segments which differs from one machining position to the next makes it possible, in a particularly advantageous way, to match the timing of the machining operations to be carried out on the work pieces in such a way that no, or only very brief, dead times occur in individual machining segments before spindles are moved to the subsequent machining positions. Dead times regularly occur in the known machines with spindle drums when a machining operation in one machining position takes longer than the machining operations in the other machining positions. With the embodiment shown, it is therefore possible to allocate only one tool unit to segment 37.4, which is used to carry out a complex and time consuming machining operation in machining segment 37.4; while machining segments 37.2, 3 and 37.5–7, are arranged in front and behind respectively. Each of these segments have two tools arranged one after the other in the direction of the movement path 35 so that in each of the larger machining segments two machining operations can be carried out in sequence while within the same period of time only one machining operation, which takes longer, is carried out in machining segment 37.4.

Furthermore, the variable design in the sizing of the machining segments has the advantage that the machining segments can be very well adjusted to the tools used, whereby the space in workspace 36, which is available over the whole of the perimeter of spindle carrier 13, can be optimally utilized.

A very remarkable advantage, which results from the ability to move the workpiece spindle units along the movement path 35 within the limits 38 of the machining segments 37, is that the workpiece spindle unit itself can carry out the movement required for complete machining of the workpieces, with respect to the tools in the direction of the X axis, for which it is moved back and forth along the guide rails by the controlled linear motor 32. The tool slides for rotary tools or similar, which in the known machines effect the relative movement between tool and workpiece in the X direction, can therefore be eliminated so that the tools for machining in the X direction can be arranged fixed, and hence particularly rigidly, in the machine. As can be seen in FIG. 1, tools 43, 44 are preferably arranged on tool slides 45, which are arranged directly on the spindle carrier 13 so that workpiece spindle and tools are close together in the machining area, which allows particularly high machining precision.

Figure 5:
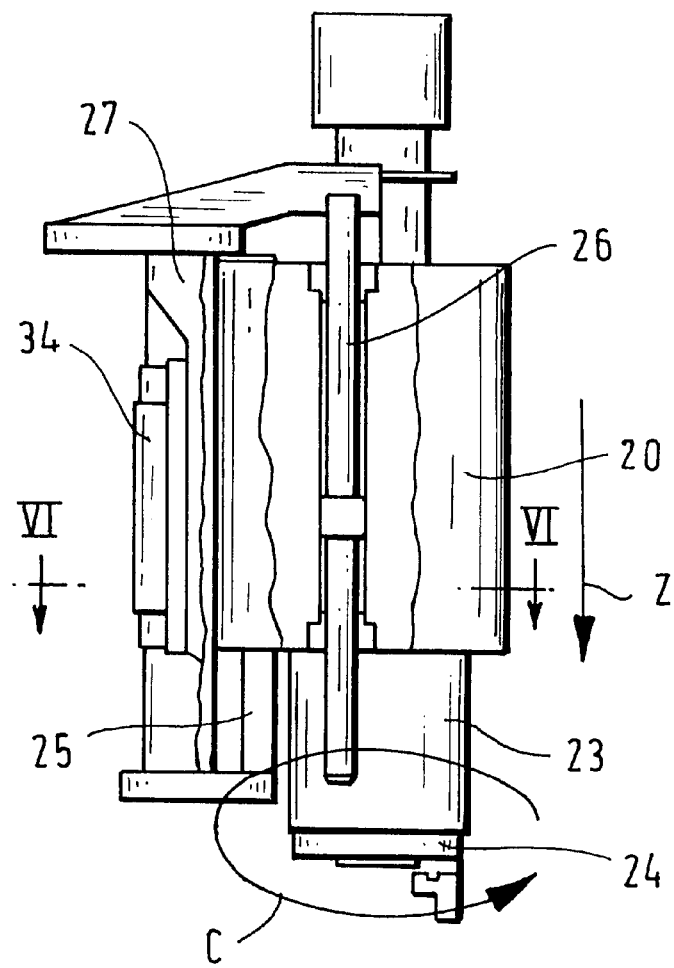
FIG. 5 shows a view of one of the workpiece spindle units along the line V in FIG. 2
Figure 6:
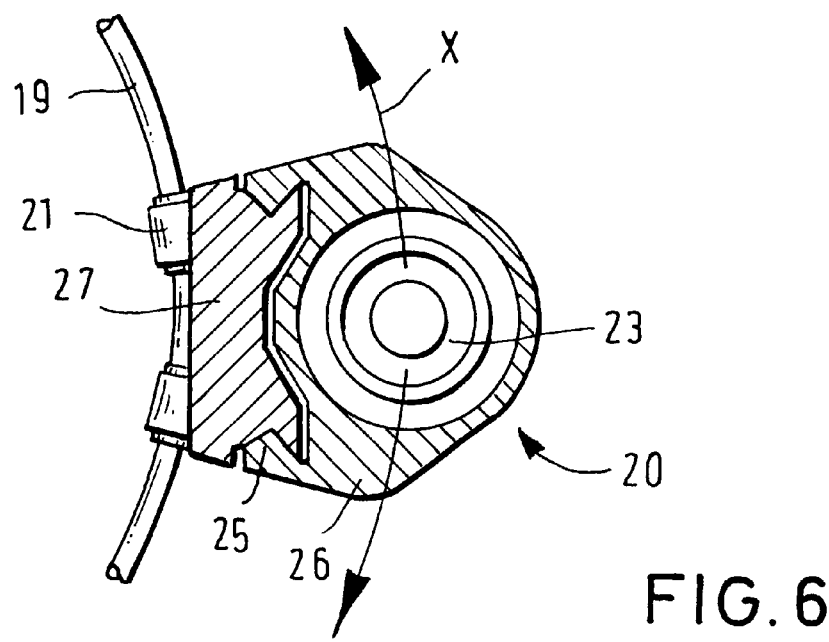
FIG. 6 shows the object of FIG. 5 in a section along the line VI—VI.

As best shown in FIGS. 1, 5 and 6, the workpiece spindle units not only execute the required movements relative to the tool in the direction of the X axis which coincides with the movement path, i.e. runs in a circular arc, but the workpiece spindle unit also executes, in a way that is actually known, the movement relative to the tool in the Z direction (vertical direction) using the hydraulic drive 26 as well as the rotary movement C of the workpiece relative to the tool, by rotating the workpiece spindle, which is equipped with a chuck, using the actuator 22. The vertical drilling tool shown in FIG. 1 and the turning tool 46 outlined in the machining area 37.2 and shown in FIG. 2, therefore do not have their own drives, instead they are mounted fixed on the spindle carrier 13 with their tool slides 45. Only the cross-drilling tool 44 (FIG. 1) is arranged by means of a slide 47 to be moveable laterally across the movement path in the Y direction in the work space 36 of the machine in order to be able to produce cross-drilled holes in the workpiece, because cross-drilled holes on the workpiece cannot be produced by moving the workpiece spindles in the direction of the circular-arc-shaped X axis.

The special design of the invention, which means that the workpiece spindle units themselves not only take over the relative movement between workpiece and tool in the Z direction, but also in the direction of the X axis, provides sufficient space in the various machining segments for the required tools to be arranged in this. Because the size or length of the individual machining segments can be varied, they can easily be adjusted to the tools to be used or to the space requirement of the tool holders, slides and the like which carry these tools. Since, in the machine as claimed in the invention, a spindle drum to hold the individual workpiece spindles has been completely eliminated, the spindle circle diameter, which in the known machines is limited by the size of the spindle drum, can actually be given any size without any disadvantage resulting, thus allowing the greatest possible freedom when dimensioning the workpiece spindle units and the machining segments and also providing a particular space advantage for machining segment 37.1 which is used for loading and unloading. The spindle carrier can be of almost any size and can therefore be designed to any required stiffness. It is not even a vital requirement that the workpiece spindle units move along a circular movement path around the spindle carrier, instead it would be entirely possible to give the spindle carrier, and thus the movement path running around it, a different shape should this be required, so that for example the workpiece spindle units could run around the spindle carrier along an elliptical path or a path with two parallel, straight sections joined at their ends by semi-circular connecting sections.

For precise control over the position and movement or rotating speeds of the workpiece spindle units, these have been equipped with a measurement system 48 to measure the movement distance or the speed in the X direction as well as a measurement device 49 to identify the path and the speed of the workpiece spindle in the Z direction and with transducers, not represented in detail, to rotate the workpiece spindle in the C direction. The relevant workpiece spindle is controlled via the associated supply unit 28 into which the values measured by the measurement system or the measurement device and the measurement sensors are fed and which triggers the workpiece spindle drives dependent on the measurement values and the predefined set values.

As is best shown in FIGS. 1 and 3, the workpiece spindles 23 or their chucks 24 project through a telescopic or fan cover 50, located between the workpiece spindle units 20, downwards into the work space 36. This cover 50 protects the workpiece spindle units against contamination from swarf, cooling liquid, cutting oil and such things. The individual vanes 51 of the cover are capable of sliding one on top of the other and thus always securely closing the variable distances between the workpiece spindle units.

The machine has a casing 52 which essentially consists of an inner protective housing 53 and an outer housing 54. The inner protective housing covers the workpiece spindle units 20 and is delimited at the bottom by the telescopic or fan cover. Between the inner housing 53 and the outer housing 54 is a ring shaped clearance space 55. The outer housing has a suction port 56 via which oil or coolant vapors originating in the work space 36 can be sucked away through the clearance space 55.

Furthermore, the outer housing has sliding doors 57 which are arranged in the area of the individual machining stations and allow largely unrestricted access to the workspace across the whole perimeter of the machine and thus in any of the work areas.

In addition to the illustrated and/or described components of the machine as claimed in the invention, the machine naturally also has known devices for loading and unloading workpieces, for control, loading of coolant, removal of swarf, etc. However, the structure and functions of such devices are generally known, so that their description has been eliminated from this document.

The invention is not limited to the embodiment described and illustrated, instead there could be many changes and additions without departing from the scope of the invention. It would, for example, be possible to design not only a multi-spindle lathe or an automatic lathe in a manner as claimed in the invention, but the construction as claimed in the invention with workpiece spindles moving independently of each other along the movement path could, for example, also be used for a grinding machine or a milling machine. The workpiece spindle could also be driven electro-mechanically in the Z direction, even if the hydraulic drive is preferred in most applications due to its smaller dimensions. The number of workpiece spindle units rotating around the spindle carrier can be freely selected; it could also be envisioned to keep the number of workpiece spindle units for a machine variable and, depending on the type of workpiece to be manufactured, to install additional or to remove one or more workpiece spindle units from the spindle carrier, thus further increasing the flexibility of the machine. With this machine, it is possible to simultaneously produce two or more workpieces which are different from each other or to simultaneously machine both sides of a workpiece in the machine. In such a case, it would be appropriate to provide eight workpiece spindle units on the spindle carrier of which two are to be used on the loading stations provided in that case, (with a rollover station, if applicable), while the remaining two by three workpiece spindle units carry out the actual machining of the work piece.

The axes of the workpiece spindles can, as in the embodiment, be arranged parallel to each other; however, it is also possible to construct them at an angle to the central axis 11 of the spindle carrier 13 which makes the chucks 24 of the workpiece spindles more accessible. The supply of data and power to the workpiece spindle units can also be effected, instead of via the supply units 28, in a similar manner to the present state of the art via supply cables which would be wound around the spindle carrier in a suitable way while the spindles rotate around the spindle carrier, which would however, after a complete machining cycle during which all workpiece spindles have passed through each machining segment once, require the workpiece spindle units to be reset to their original positions.

The invention has been described with reference to preferred and alternate embodiments. Modifications and alterations will become apparent to those skilled in the art upon reading and understanding the detailed discussion of the invention provided herein. The invention is intended to include all such modifications and alterations insofar as they come within the scope of the present invention.

What is claimed is:

1. A multi-spindle machine tool having several workpiece spindle units arranged around a central axis for rotational drive and advancement from one machining position to the next, all of the workpiece spindle units being movable independently of one another along a movement path running around the central axis, said machining positions being distributed and arranged in a form of machining segments, each of said workpiece spindle units including a workpiece spindle, each of said machining segments including one of said workpiece spindle units, each of said machining segments defining a limit in which said workpiece spindle unit and respective workpiece spindle are moveable along said movement path during a machining cycle.

2. The machine tool as defined in claim 1, wherein said multi-spindle machine tool is a multi-spindle automatic lathe.

3. The machine tool as defined in claim 2, wherein a plurality of workpiece spindle units include an individual drive device to move each of said plurality of workpiece spindle units along said movement path.

4. The machine tool as defined in claim 3, wherein each drive device includes a component selected from the group consisting of a position measuring device, a speed measuring device, and combinations thereof.

5. The machine tool as defined in claim 4, wherein a plurality of said workpiece spindle units each include its own supply unit which moves along said movement path with said workpiece spindle unit, each of said supply units including devices selected from the group consisting of control devices for the workpiece spindle, control devices for an actuator, power supply devices for the workpiece spindle, power supply devices for an actuator, and combinations thereof.

6. The machine tool as defined in claim 1, wherein a plurality of workpiece spindle units include an individual drive device to move each of said plurality of workpiece spindle units along said movement path.

7. The machine tool as defined in claim 6, wherein each drive device includes a component selected from the group consisting of a position measuring device, a speed measuring device, and combinations thereof.

8. The machine tool as defined in claim 7, wherein a plurality of said workpiece spindle units each include its own supply unit which moves along said movement path with said workpiece spindle unit, each of said supply units including devices selected from the group consisting of control devices for the workpiece spindle, control devices for an actuator, power supply devices for the workpiece spindle, power supply devices for an actuator, and combinations thereof.

9. The machine tool as defined in claim 8, wherein a plurality of said machining segments are of variable length in the direction of the movement path.

10. The machine tool as defined in claim 6, wherein a plurality of said workpiece spindle units each include its own supply unit which moves along said movement path with said workpiece spindle unit, each of said supply units including devices selected from the group consisting of control devices for the workpiece spindle, control devices for an actuator, power supply devices for the workpiece spindle, power supply devices for an actuator, and combinations thereof.

11. The machine tool as defined in claim 6, wherein a plurality of said machining segments are of variable length in the direction of the movement path.

12. The machine tool as defined in claim 1, wherein a plurality of said workpiece spindle units each include its own supply unit which moves along said movement path with said workpiece spindle unit, each of said supply units including devices selected from the group consisting of control devices for the workpiece spindle, control devices for an actuator, power supply devices for the workpiece spindle, power supply devices for an actuator, and combinations thereof.

13. The machine tool as defined in claim 12, wherein a plurality of said machining segments are of variable length in the direction of the movement path.

14. The machine tool as defined in claim 1, wherein a plurality of said machining segments are of variable length in the direction of the movement path.

15. The machine tool as defined in claim 1, wherein a plurality of said workpiece spindles each include its own rotary drive.

16. The machine tool as defined in claim 1, wherein a plurality of said workpiece spindles each include its own travel actuator.

17. The machine tool as defined in claim 1, wherein said workpiece spindle units are arranged movably on a central, fixed spindle carrier.

18. The machine tool as defined in claim 17, wherein said workpiece spindle units include guide shoes by which said workpiece spindle units are guided along at least one guide rail arranged on said spindle carrier.

19. The machine tool as defined in claim 18, wherein a plurality of said workpiece spindle units each include a stator element for a drive device, said spindle carrier including a rotor element for said drive device which is shared by a plurality of said workpiece spindle units.

20. The machine tool as defined in claim 19, wherein said drive device includes a linear motor.

21. The machine tool as defined in claim 17, wherein a plurality of said workpiece spindle units each include a stator element for a drive device, said spindle carrier including a rotor element for said drive device which is shared by a plurality of said workpiece spindle units.

22. The machine tool as defined in claim 5, wherein a plurality of said machining segments are of variable length in the direction of the movement path.

23. The machine tool as defined in claim 22, wherein a plurality of said workpiece spindles each include its own rotary drive.

24. The machine tool as defined in claim 23, wherein a plurality of said workpiece spindles each include its own travel actuator.

25. The machine tool as defined in claim 24, wherein said workpiece spindle units are arranged movably on a central, fixed spindle carrier.

26. The machine tool as defined in claim 25, wherein said workpiece spindle units include guide shoes by which said workpiece spindle units are guided along at least one guide rail arranged on said spindle carrier.

27. The machine tool as defined in claim 26, wherein a plurality of said workpiece spindle units each include a stator element for a drive device, said spindle carrier including a rotor element for said drive device which is shared by a plurality of said workpiece spindle units.

28. The machine tool as defined in claim 27, wherein said drive device includes a linear motor.

29. The machine tool as defined in claim 28, wherein a plurality of said workpiece spindle units are movable along a circular movement path.

30. The machine tool as defined in claim 29, wherein said central axis is a vertical axis.

31. The machine tool as defined in claim 30, wherein an axis of rotation of a plurality of said workpiece spindles is arranged parallel to each other.

32. The machine tool as defined in claim 31, wherein an axis of rotation of a plurality of said workpiece spindles is arranged parallel to said central axis.

33. The machine tool as defined in claim 31, wherein an axis of rotation of a plurality of said workpiece spindles is arranged at an angle to the central axis.

34. The machine tool as defined in claim 31, including tools at said at least one machining segment and arranged at least closely adjacent to the spindle carrier, said tools including devices selected from the group consisting of machining tools, machining units, and combinations thereof.

35. The machine tool as defined in claim 34, wherein said at least one of said machining tools being carried by a slide.

36. The machine tool as defined in claim 34, wherein said workpiece spindle units include workpiece clamps, said workpiece clamps projecting through an opening in a cover which separates said tools operating in said machining segments from said workpiece spindles.

37. The machine tool as defined in claim 35, including a machine casing which covers at least one of said workpiece spindle units.

38. The machine tool as defined in claim 37, wherein said machine casing includes an inner protective housing which covers a plurality of said workpiece spindle units and an outer protective housing surrounding the inner housing with a clearance gap between the two housings and a suction device that is connected to the outer protective housing.

39. The machine tool as defined in claim 38, wherein said machine casing includes access openings at said machining segments.

40. The machine tool as defined in claim 39, wherein said machining segments are of different sizes, in the direction of the movement path, and are matched to various machining operations.

41. The machine tool as defined in claim 1, wherein a plurality of said workpiece spindle units are movable along a circular movement path.

42. The machine tool as defined in claim 1, wherein said central axis is a vertical axis.

43. The machine tool as defined in claim 1, wherein an axis of rotation of a plurality of said workpiece spindles is arranged parallel to each other.

44. The machine tool as defined in claim 43, wherein an axis of rotation of a plurality of said workpiece spindles is arranged parallel to said central axis.

45. The machine tool as defined in claim 43, wherein an axis of rotation of a plurality of said workpiece spindles is arranged at an angle to the central axis.

46. The machine tool as defined in claim 1, wherein an axis of rotation of a plurality of said workpiece spindles is arranged at an angle to the central axis.

47. The machine tool as defined in claim 1, including tools at said at least one machining segment and arranged at least closely adjacent to the spindle carrier, said tools including devices selected from the group consisting of machining tools, machining units, and combinations thereof.

48. The machine tool as defined in claim 47, wherein said at least one of said machining tools being carried by a slide.

49. The machine tool as defined in claim 47, wherein said workpiece spindle units include workpiece clamps, said workpiece clamps projecting through an opening in a cover which separates said tools operating in said machining segments from said workpiece spindles.

50. The machine tool as defined in claim 1, including a machine casing which covers at least one of said workpiece spindle units.

51. The machine tool as defined in claim 50, wherein said machine casing includes an inner protective housing which covers a plurality of said workpiece spindle units and an outer protective housing surrounding the inner housing with a clearance gap between the two housings and a suction device that is connected to the outer protective housing.

52. The machine tool as defined in claim 50, wherein said machine casing includes access openings at said machining segments.

53. The machine tool as defined in claim 1, wherein said machining segments are of different sizes, in the direction of the movement path, and are matched to various machining operations.

* * * * *

UNITED STATES PATENT AND TRADEMARK OFFICE
CERTIFICATE OF CORRECTION

PATENT NO.   : 6,298,759 B1
DATED        : October 9, 2001
INVENTOR(S)  : Albert Herrscher and Detlef Langer It is certified that error appears in the above-identified patent and that said Letters Patent is hereby corrected as shown below:

<u>Title page,</u>
Item [73], Assignee: change "Alfred Schutte GmbH & Co." to -- Assignee: Alfred H. Schutte GmbH & Co. KG --.

Signed and Sealed this

Seventh Day of May, 2002

Attest:

JAMES E. ROGAN
*Attesting Officer*     *Director of the United States Patent and Trademark Office*